(12) United States Patent
Aoyama et al.

(10) Patent No.: US 12,697,693 B2
(45) Date of Patent: Aug. 4, 2026

(54) MACHINE TOOL HAVING TOOL REST, CONTROL UNIT, TOOL STORAGE UNIT, TOOL CHANGING UNIT, AND TOOL MANAGEMENT UNIT

(71) Applicant: DMG MORI CO., LTD., Nara (JP)

(72) Inventors: Akihisa Aoyama, Nara (JP); Tetsushi Asada, Nara (JP)

(73) Assignee: DMG MORI CO., LTD., Nara (JP)

( * ) Notice: Subject to any disclaimer, the term of this patent is extended or adjusted under 35 U.S.C. 154(b) by 893 days.

(21) Appl. No.: 18/088,559

(22) Filed: Dec. 24, 2022

(65) Prior Publication Data

US 2023/0241734 A1 Aug. 3, 2023

(30) Foreign Application Priority Data

Feb. 1, 2022 (JP) ................................. 2022-013923

(51) Int. Cl.
| | |
|---|---|
| *B23Q 3/155* | (2006.01) |
| *B23Q 3/157* | (2006.01) |
| *B23B 3/16* | (2006.01) |
| *G05B 19/4065* | (2006.01) |

(52) U.S. Cl.
CPC ....... *B23Q 3/1572* (2013.01); *B23Q 3/15503* (2016.11); *B23Q 3/15513* (2013.01); *B23Q 3/15573* (2013.01); *B23B 3/162* (2013.01); *B23Q 2003/15586* (2013.01); *G05B 19/4065* (2013.01); *Y10T 29/5109* (2015.01); *Y10T 483/123* (2015.01); *Y10T 483/1705* (2015.01); *Y10T 483/1721* (2015.01)

(58) Field of Classification Search
CPC ...... B23Q 2003/15586; B23Q 3/15503; B23Q 3/155–3/15793; Y10T 483/1719–1721; Y10T 483/12–138; Y10T 483/10; G05B 19/4065
USPC ........................ 483/24–25, 4–11, 1; 700/179
See application file for complete search history.

(56) References Cited

U.S. PATENT DOCUMENTS

| | | | | |
|---|---|---|---|---|
| 3,925,877 A | * | 12/1975 | Junike ................ | B23Q 3/15573 483/68 |
| 5,395,297 A | * | 3/1995 | Takada ............... | B23Q 3/15526 483/62 |
| 12,569,950 B2 | * | 3/2026 | Asada ................ | B23Q 3/15713 |

(Continued)

FOREIGN PATENT DOCUMENTS

| | | | | |
|---|---|---|---|---|
| JP | 60-044241 A | * | 3/1985 | |
| JP | 02-083134 A | * | 3/1990 | |
| JP | 6779406 B | | 11/2020 | |

*Primary Examiner* — Erica E Cadugan
(74) *Attorney, Agent, or Firm* — IP Business Solutions, LLC

(57) ABSTRACT

In a case of attaching a plurality of tools of the same type to a tool rest, machining work is continued even when a sufficient number of normal tools are not left. A machine tool includes a tool rest including a first holder for an inner-diameter side and a second holder for an outer-diameter side, a machining control unit configured to control the tool rest to machine the workpiece, a tool changing unit configured to change tools, and a tool management unit configured to identify an unused tool. In a case of attaching a plurality of tools of the same type to both the first and second holders, when the number of the first holders is larger than the number of the second holders, the tool changing unit attaches the unused tool to the first holder.

5 Claims, 11 Drawing Sheets

(56)          References Cited

U.S. PATENT DOCUMENTS

2023/0264310 A1 *   8/2023   Hikita ................ B23Q 3/15539
                                                483/58
2023/0278152 A1 *   9/2023   Aoyama ............ B23Q 3/15503
                                                483/58
2023/0415287 A1 *  12/2023   Yasugi ............... B23Q 3/15539

\* cited by examiner

| STATION NUMBER | EDGE POSITION | | CURRENT TOOL PATTERN | | |
| --- | --- | --- | --- | --- | --- |
| | | | TOOL ID | MODEL NUMBER | |
| S1 | OUTER DIAMETER | | T1 | P15 | |
| S2 | INNER DIAMETER | | T3 | P4 | |
| S3 | OUTER DIAMETER | | T8 | P2 | |
| S4 | INNER DIAMETER | | T2 | P8 | ←——→ P1 |
| S5 | OUTER DIAMETER | | T15 | P2 | |
| S6 | INNER DIAMETER | | T22 | P4 | |
| S7 | OUTER DIAMETER | | T4 | P6 | ←——→ P1 |
| S8 | INNER DIAMETER | | T17 | P5 | |
| S9 | OUTER DIAMETER | | T26 | P12 | ←——→ P1 |
| S10 | INNER DIAMETER | | T10 | P6 | |
| S11 | OUTER DIAMETER | | T14 | P3 | |
| S12 | INNER DIAMETER | | T6 | P3 | |

230                                    232

MACHINE TOOL HAVING TOOL REST, CONTROL UNIT, TOOL STORAGE UNIT, TOOL CHANGING UNIT, AND TOOL MANAGEMENT UNIT

BACKGROUND OF INVENTION

1. Field

The present invention relates to a technology for tool change in machine tools.

2. Description of Related Art

Machine tools include devices for cutting a workpiece into a desired shape, and devices for depositing metal powder or the like to make a workpiece. Examples of machine tools for cutting include a turning center that machines a workpiece by applying a cutting tool to the workpiece that is being turned, a machining center that machines a workpiece by applying a turning tool to the workpiece, and a combined machine including these functions in combination.

In a machine tool including a tool rest, a plurality of tools may be attached to the tool rest. The machine tool machines a workpiece while moving the tool rest (turret base) three-dimensionally and selecting a tool to be applied to the workpiece from the tools attached to the tool rest in accordance with a machining program prepared in advance.

Some machine tools include an external tool storage unit that has a number of tools stored therein. When a necessary tool is not attached to the tool rest, the machine tool attaches a specified tool to the tool rest from the tool storage unit and continues machining of the workpiece. Hereinafter, a tool attached to the tool rest is referred to as a "work tool", and a tool stored in the tool storage unit is referred to as a "spare tool". Unless otherwise specified, they are simply referred to as a "tool" (refer to JP 6779406 B).

Related Art List

JP 6779406 B

A plurality of tools may be attached to a tool rest in a plurality of methods. For example, two types of holders including a holder for cutting an inner-diameter side portion of a workpiece and a holder for cutting an outer-diameter side portion of a workpiece may be set in the tool rest, or a holder for turning and a holder for rotary machining may be set. Tools are fixed to these holders.

Further, a plurality of tools of the same type may be attached to the tool rest. For example, in a tool rest including both a holder HI for inner diameter machining and a holder HO for outer diameter machining, the following situation may occur when three or more tools T of the same type are attached to both the holder HO and the holder HI.

Tools are worn by machining a workpiece. A machine tool manages a usage state of each tool. In a case of attaching three tools T of the same type to two holders HI (for inner diameter machining) and one holder HO (for outer diameter machining), there is a possibility that a tool selected from a tool storage unit in order to be attached to the holder HO on the minority side is not suitable for continuous use. In the following descriptions, such a tool that has become a state where it is not to be used is referred to as an "unused tool", and a tool in a usable state is referred to as a "normal tool". When the unused tool is attached to the only one holder HO (for outer diameter machining), the machine tool cannot perform outer diameter machining even after performing tool change.

Such a problem does not occur if only a normal tool is selected at the time of tool change. However, no normal tool may be left in the tool storage unit.

SUMMARY OF INVENTION

A machine tool according to an aspect of the present invention includes: a tool rest including a first holder configured to hold a tool for cutting an inner-diameter side portion of a workpiece and a second holder configured to hold a tool for cutting an outer-diameter side portion of a workpiece; a machining control unit configured to control a tool held by the tool rest to machine a workpiece in accordance with a machining program; a tool storage unit capable of storing a plurality of tools therein; a tool changing unit configured to change the tool held by the tool rest with a tool stored in the tool storage unit; and a tool management unit configured to identify an unused tool in tools stored in the tool storage unit, the unused tool being a tool not to be used.

In a case where a plurality of tools of a same type are attached to both the first and second holders, when the tools of the same type to be attached include the unused tool and, in holders to which the tools are attached, number of the first holders is larger than number of the second holders, the tool changing unit attaches the unused tool to the first holder.

A machine tool according to another aspect of the present invention includes: a tool rest including a first holder configured to hold a tool for cutting an inner-diameter side portion of a workpiece and a second holder configured to hold a tool for cutting an outer-diameter side portion of a workpiece; a machining control unit configured to control a tool held by the tool rest to machine a workpiece in accordance with a machining program; a tool storage unit capable of storing a plurality of tools therein; a tool changing unit configured to change the tool held by the tool rest with a tool stored in the tool storage unit; and a tool management unit configured to identify an unused tool in tools stored in the tool storage unit, the unused tool being a tool not to be used.

In a case where a plurality of tools of a same type are attached to both the first and second holders, when the tools of the same type to be attached include the unused tool and, in holders to which the tools are attached, number of the second holders is larger than number of the first holders, the tool changing unit attaches the unused tool to the second holder.

A machine tool according to still another aspect of the present invention includes: a tool rest including a first holder configured to allow a shank portion of a tool to be inserted thereinto in a first direction to hold the tool and a second holder configured to allow a shank portion of a tool to be inserted thereinto in a second direction different from the first direction to hold the tool; a machining control unit configured to control a tool held by the tool rest to machine a workpiece in accordance with a machining program; a tool storage unit capable of storing a plurality of tools therein; a tool changing unit configured to change the tool held by the tool rest with a tool stored in the tool storage unit; and a tool management unit configured to identify an unused tool in tools stored in the tool storage unit, the unused tool being a tool not to be used.

In a case where a plurality of tools of a same type are attached to the first and second holders, when the tools of the same type to be attached include the unused tool and, in holders to which the tools are to be attached, number of the first holders is larger than number of the second holders, the tool changing unit attaches the unused tool to the first holder.

A machine tool according to still another aspect of the present invention includes: a tool rest including a turning holder configured to fix a tool to allow the tool to perform turning and a rotary holder configured to fix a tool to allow the tool to perform rotary machining; a machining control unit configured to control a tool attached to the tool rest to machine a workpiece in accordance with a machining program; a tool storage unit capable of storing a plurality of tools therein; a tool changing unit configured to change the tool attached to the tool rest with a tool stored in the tool storage unit; and a tool management unit configured to identify an unused tool in tools stored in the tool storage unit, the unused tool being prohibited from use.

In a case where a plurality of tools of a same type are attached to the turning holder and the rotary holder, when the tools of the same type to be attached include the unused tool, and number of one of the turning holders and the rotary holders on which the tools are to be attached is larger than number of the other, the tool changing unit attaches the unused tool to a majority-side holder.

According to the present invention, in a case of attaching a plurality of tools of the same type to a tool rest, machining work can easily be continued even when there are few normal tools.

BRIEF DESCRIPTION OF DRAWINGS

FIG. 8 is a schematic diagram illustrating a relation between station setting information and current pattern information;

DETAILED DESCRIPTION

A machine tool in the present embodiment is a turning center or a combined machine. First, the structure of a machine tool is mainly described with reference to FIGS. 1 to 5. Details of control of tool change in the present embodiment are described with reference to FIG. 6 and subsequent drawings.

Figure 1:
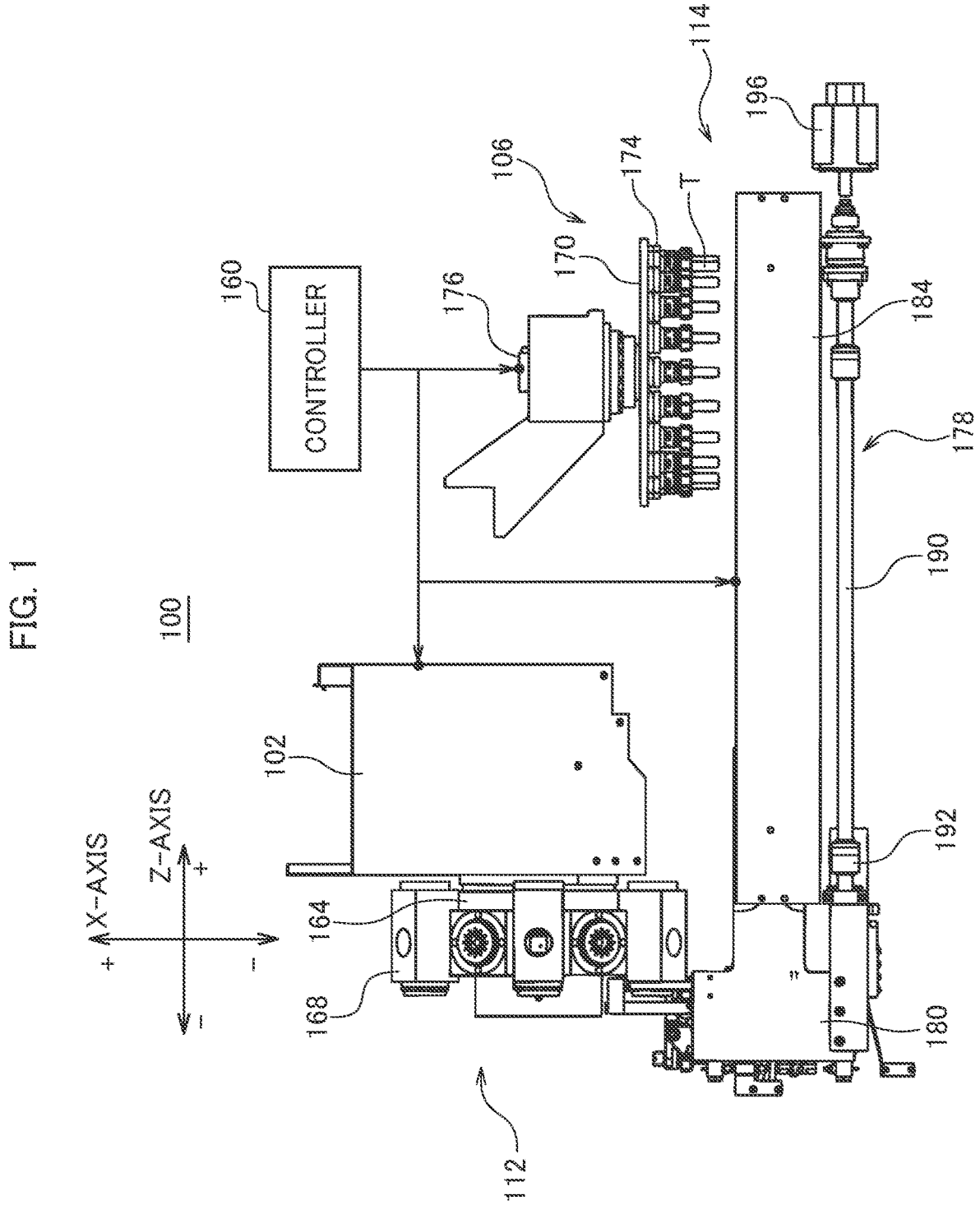
FIG. 1 is a plan view illustrating a schematic configuration of a machine tool in an embodiment of the present invention.

FIG. 1 is a plan view illustrating a schematic configuration of a machine tool 100 in the present embodiment.

The machine tool 100 includes a controller 160, machining equipment 112, a tool changing unit 114, and a tool storage unit 106. The controller 160 corresponds to an information processing device 118 and a machining control unit 116 described later with reference to FIG. 6. A turret base 102 and a turret 164 are movable in the X, Y, and Z-axis directions. The turret base 102 and the turret 164 may be collectively referred to as a tool rest, and only the turret 164 may be referred to as a tool rest. FIG. 1 is a plan view in an X-Z plane. The turret 164 is disposed on the turret base 102 to be rotatable about the Z-axis. The tool storage unit 106 (a tool magazine) is provided on the positive side in the Z-axis direction of the turret base 102. The tool changing unit 114 transfers a tool T.

Figure 2:
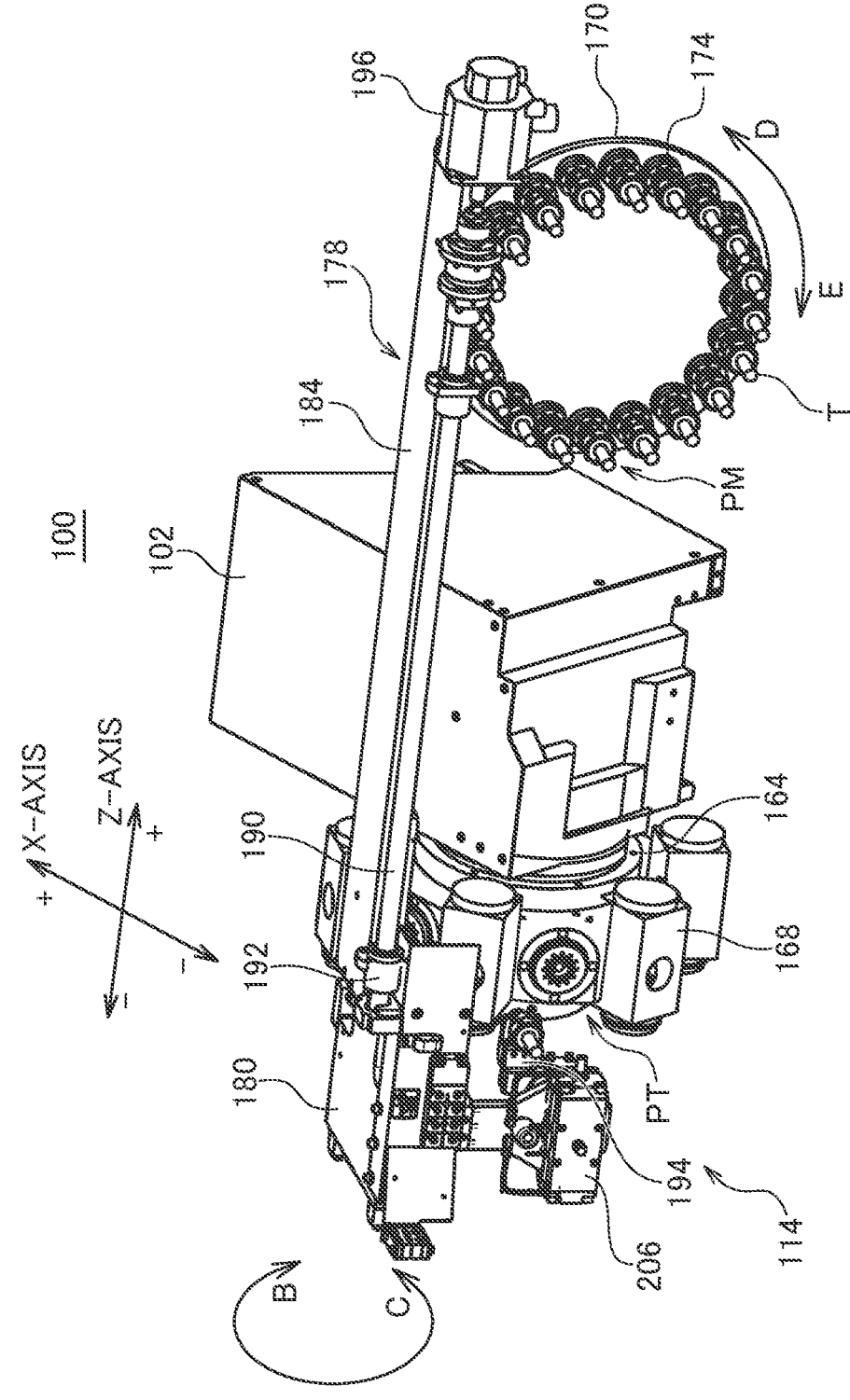
FIG. 2 is a perspective view of the machine tool.

FIG. 2 is a perspective view of the machine tool 100.

The turret 164 in the shape of a prism has a plurality of holders 168 for holding tools on its outer peripheral plane. The holders 168 are attached to a turret body to be detachable. The tool attached to the holder 168 at a position PT is the target of attachment and detachment. By rotating the turret 164 in a direction of an arrow B-C (a direction of rotation about the Z-axis), each holder 168 can be indexed to the attachment/detachment position PT.

The tool storage unit 106 includes a holding plate 170 provided to be rotatable in a direction of an arrow D-E (a direction of rotation about the X-axis), holding pots 174 arranged at regular intervals on the peripheral edge of the holding plate 170, and a driving motor 176 (see FIG. 3) that rotates the holding plate 170. The holding pot 174 holds the tool. The holding pot 174 protrudes to the negative side in the X-axis direction. The tool in the holding pot 174 at a position PM is the target of attachment and detachment. The driving motor 176 rotates the holding plate 170, whereby each holding pot 174 can be indexed to the attachment/detachment position PM.

Figure 3:
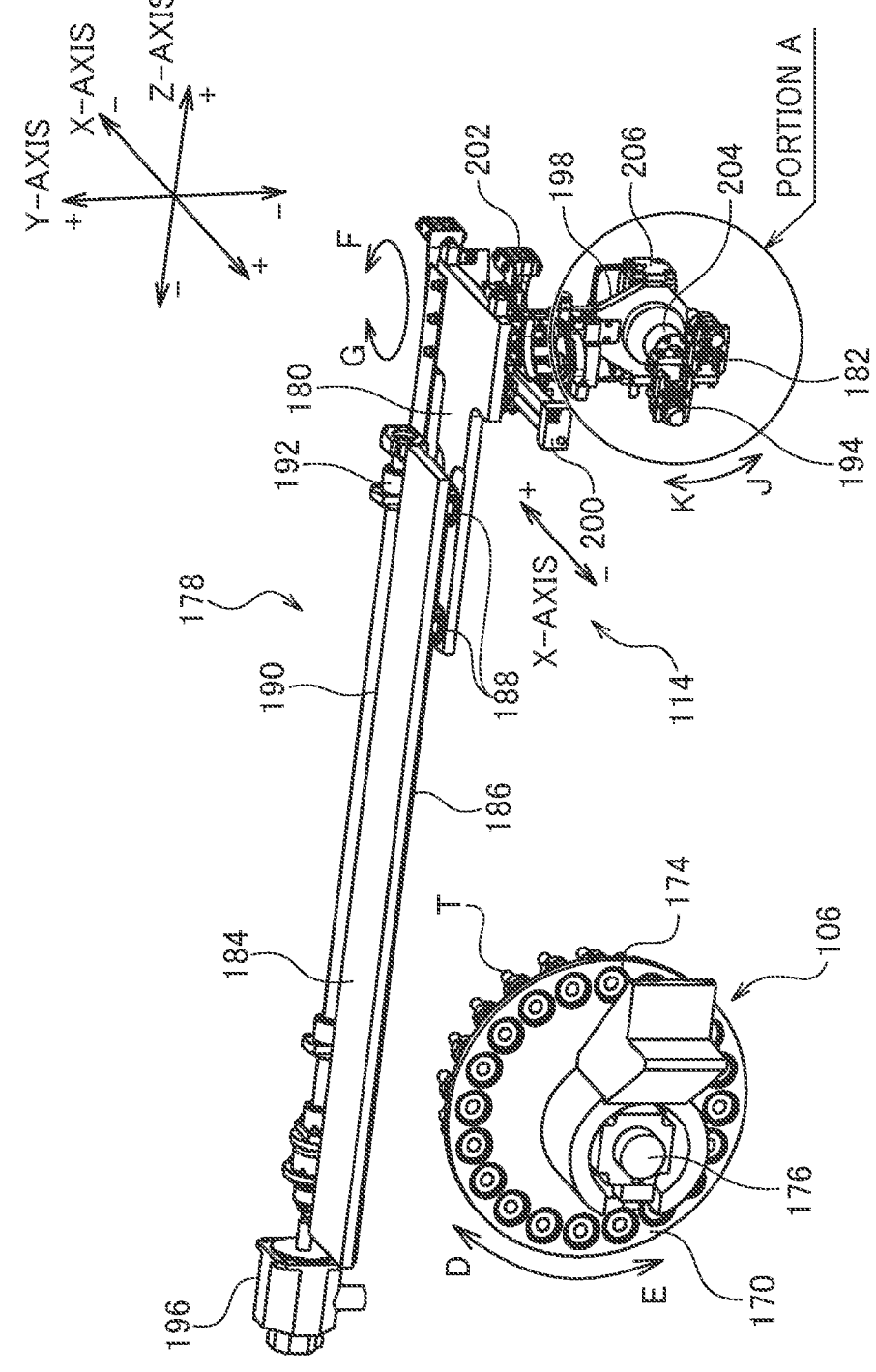
FIG. 3 is a perspective view of a tool storage unit and a tool changing unit.

FIG. 3 is a perspective view of the tool storage unit 106 and the tool changing unit 114.

The tool changing unit 114 is provided on the negative side in the X-axis direction of the turret base 102 and the tool storage unit 106 (see FIG. 1). The tool changing unit 114 includes a feed mechanism 178 provided along the Z-axis, a movable base 180 that can be moved along the Z-axis by the feed mechanism 178, and a first hand 182 and a second hand 194 attached to the movable base 180, for example.

The feed mechanism 178 includes a rail holding base 184 arranged parallel to the Z-axis, two guide rails 186 attached to a lower surface of the rail holding base 184 to be parallel to the Z-axis, two sliders 188 provided for each guide rail 186 to engage with that guide rail 186, a ball screw 190 arranged along the rail holding base 184, a ball nut 192 screwed to the ball screw 190, and a servo motor 196 coupled to an end of the ball screw 190 to rotate the ball screw 190 about an axis line. The sliders 188 are fixed to an upper surface of the movable base 180.

On a lower surface of the moving base 180, a holding member 198 is arranged to be rotatable in a direction of an arrow F-G (a direction of rotation about the Y-axis) and movable in the X-axis direction. The holding member 198 is driven in the X-axis direction by a moving cylinder 200. The holding member 198 is driven by a driving cylinder 202 via a mechanism such as a rack and pinion mechanism, and turns in the direction of the arrow F-G within an angular range of 90 degrees. That is, the holding member 198 is configured to be movable on an X-Z plane and rotatable in the F-G direction. FIG. 3 illustrates a state in which the holding member 198 has been rotated in the F direction.

A rotating shaft 204 is attached to the holding member 198 to penetrate therethrough. The rotating shaft 204 is driven by a driving cylinder 206 via a mechanism such as a rack and pinion mechanism, and rotates in a direction of an arrow J-K within an angular range of 180 degrees.

Figure 4:
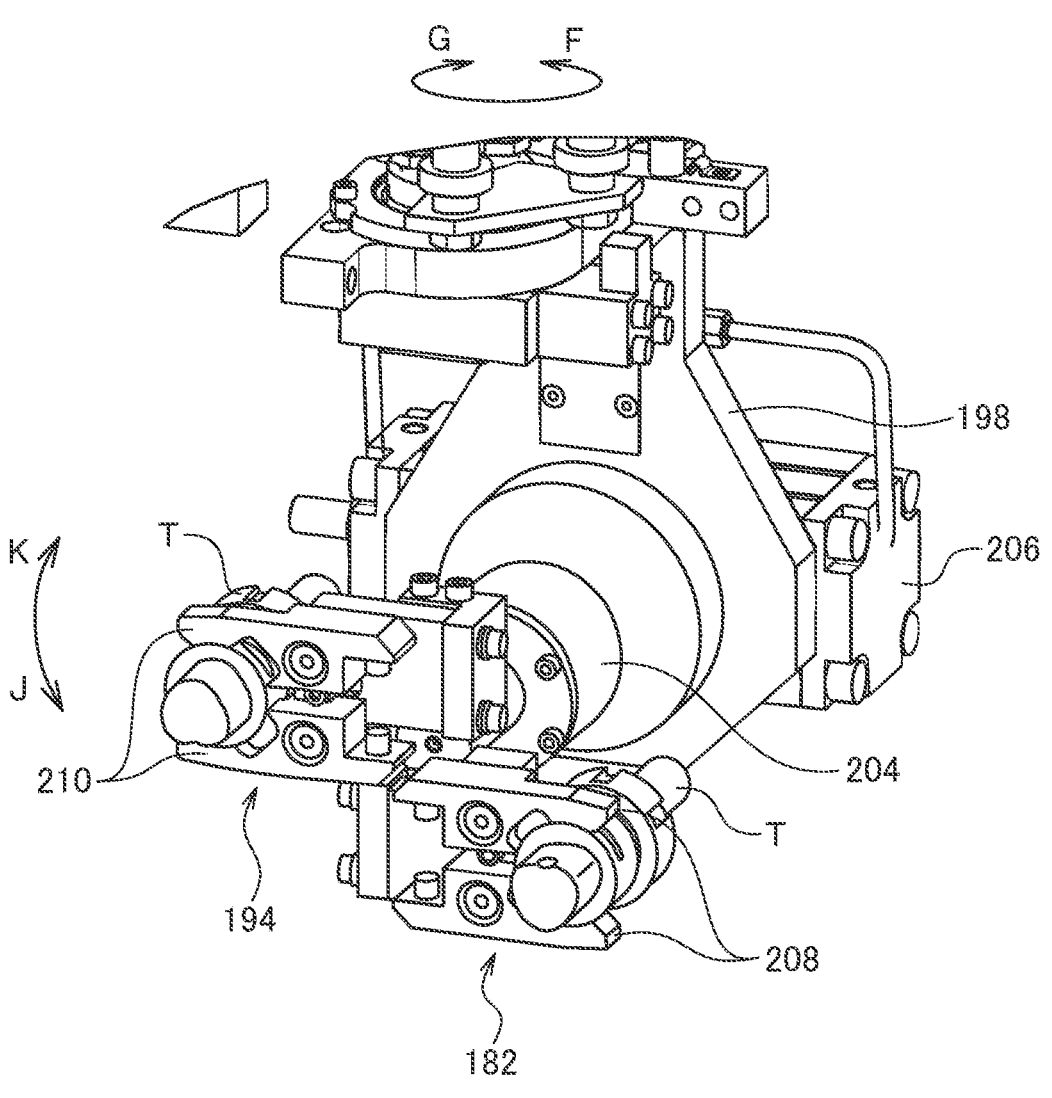
FIG. 4 is an enlarged perspective view of a portion A illustrated in FIG. 3.

FIG. 4 is an enlarged perspective view of a portion A illustrated in FIG. 3.

The first hand 182 and the second hand 194 are attached to an end of the rotating shaft 204 to be point-symmetric with respect to the axis center of the rotating shaft 204 and be parallel to each other in a vertical direction. The first hand 182 and the second hand 194 have the same configuration as each other. The first hand 182 has a pair of gripping claws 208 for gripping the tool and can grip the tool with the gripping claws 208. Similarly, the second hand 194 also has a pair of gripping claws 210 and can grip the tool with the gripping claws 210.

When the holding member 198 is rotated to the direction of the arrow F (the rotation state illustrated in FIGS. 3 and 4), the gripping claws 208 and 210 of the first and second hands 182 and 194 each have such a posture that it is along the Z-axis direction (an orthogonal direction orthogonal to the axis line direction of the tool gripped by the gripping claws 208 or the like). When the holding member 198 is rotated to the direction of the arrow G, the gripping claws 208 and 210 of the first and second hands 182 and 194 each have such a posture that it is along the X-axis direction.

When the holding member 198 is at an end of movement on the positive side in the X-axis direction (this position is referred to as a "first X position") and at an end of rotation in the F direction, the tool held in the holding pot 174 indexed to the attachment/detachment position PM can be gripped by the first hand 182 or the second hand 194.

Further, when the first hand 182 grips the tool on its upper side and no tool is held in the holding pot 174 at the attachment/detachment position PM, the tool gripped by the first hand 182 can be accommodated in the holding pot 174 (an empty holding pot) at the attachment/detachment position PM.

It is assumed that the movable base 180 is located at an intermediate position between the turret 164 and the tool storage unit 106. Here, the holding member 198 is moved to an end of movement on the negative side in the X-axis direction (this position is referred to as a "second X position") and rotated to the end of rotation in the direction of the arrow F. Next, the movable base 180 is moved to the positive side in the Z-axis direction, and the axis center (the X-axis direction) of the tool gripped by the first hand 182 is made to coincide with the axis center of the holding pot 174 (the Z coordinate at this time is referred to as a "first Z position"). Subsequently, the holding member 198 is moved to the positive side in the X-axis direction to the "first X position", and the tool in the first hand 182 is attached to the empty holding pot 174 at the attachment/detachment position PM. Thereafter, the movable base 180 is moved to the negative side in the Z-axis direction (this position is referred to as a "second Z position"), whereby gripping of the tool by the first hand 182 is released.

Meanwhile, when the first hand 182 is located on the upper side, no tool is gripped by the gripping claws 208 of the first hand 182, and the tool is held at the attachment/detachment position PM, the tool at the attachment/detachment position PM can be taken out by the first hand 182.

It is assumed that the movable base 180 is located at an intermediate position between the turret 164 and the tool storage unit 106. Here, after the holding member 198 is rotated to the end of rotation in the direction of the arrow F (the rotation state illustrated in FIGS. 3 and 4) and the movable base 180 is moved to the "second Z position", the movable base 180 is moved to the "first X position" and then moved to the aforementioned "first Z position". Accordingly, the tool attached at the attachment/detachment position PM enters an opening of the pair of gripping claws 208 and is gripped by the gripping claws 208. Next, the holding member 198 is moved to the "second X position". The tool attached to the holding pot 174 is thus taken out from the holding pot 174 while being gripped by the pair of gripping claws 208.

As for the turret 164, in a case where the holder 168 indexed to the attachment/detachment position PT is of a type that holds the tool along a radial direction, the tool held in the holder 168 can be gripped by the first hand 182 or the second hand 194 positioned on the lower side when the holding member 198 of the tool changing unit 114 is at the "first X position" and at the end of rotation in the direction of the arrow F.

When the first hand 182 is positioned on the upper side, the second hand 194 is positioned on the lower side, the first hand 182 grips the tool, the second hand 194 does not grip the tool, and the tool is held at the attachment/detachment position PT, it is possible to change the tool gripped by the first hand 182 with the tool held in the holder 168 at the attachment/detachment position PT.

It is assumed that the movable base 180 is located at an intermediate position between the turret 164 and the tool storage unit 106. Here, the holding member 198 is rotated to the end of rotation in the direction of the arrow F and is moved to the "second X position. In this state, the movable base 180 is moved to a predetermined position (this position is referred to as a "third Z position") set in the negative side in the Z-axis direction. The "third Z position" is located at such a position that, when the holding member 198 is moved to the "first X position", the second hand 194 positioned on the lower side is located on the positive side in the Z-axis direction of the tool held in the holder 168, in other words, at a front position at which the second hand 194 does not interfere with the tool.

After the holding member 198 is moved to the "first X position", the movable base 180 is moved to a predetermined position (this position is referred to as a "fourth Z position") set in the negative side in the Z-axis direction. Accordingly, the tool at the attachment/detachment position PT enters an opening of the pair of gripping claws 210 and is gripped by the gripping claws 210. Next, when the holding member 198 is moved to the "second X position", the tool attached to the holder 168 is taken out from the holder 168 by the pair of gripping claws 210.

Next, the driving cylinder 206 turns the first and second hands 182 and 194 upside down to position the second hand 194 on the upper side and position the first hand 182 on the lower side, and moves the holding member 198 to the "first X position". Accordingly, the tool gripped by the first hand 182 is disposed at the attachment/detachment position PT. Subsequently, when the movable base 180 is moved to the "third Z position", gripping of the tool by the first hand 182 is released. By the first change operation described above, the tool gripped by the first hand 182 and the tool at the attachment/detachment position PT are changed with each other. The tool gripped by the second hand 194 can be accommodated in the tool storage unit 106 by the accommodating operation described above.

In a case where the holder 168 indexed to the attachment/detachment position PT of the turret 164 is of a type that holds the tool along the Z-axis, the tool held in this holder 168 can be gripped by the first hand 182 or the second hand 194 positioned on the lower side, when the holding member 198 is at an end of rotation in the direction of the arrow G and at the "first X position".

When the first hand 182 is positioned on the upper side, the second hand 194 is positioned on the lower side, the second hand 182 grips the tool, the second hand 194 does not grip the tool, and the tool is held at the attachment/detachment position PT, it is possible to change the tool gripped by the first hand 182 with the tool at the attachment/detachment position PT.

It is assumed that the movable base 180 is located at an intermediate position between the turret 164 and the tool storage unit 106. Here, the holding member 198 is rotated to the end of rotation in the direction of the arrow G and is moved to the "second X position", and the movable base 180 is moved to the "third Z position" set in the negative side in the Z-axis direction. At this time, the second hand 194 is located at such a position that it can grip the tool held in the holder 168.

Next, the holding member 198 is moved to the "first X position". The tool at the attachment/detachment position PT thus enters the opening of the pair of gripping claws 210 and is gripped by the gripping claws 210. Thereafter, when the holding member 198 is moved to the "fourth Z position" set on the negative side in the Z-axis direction, the tool attached to the holder 168 is taken out from the holder 168 by the pair of gripping claws 210.

Next, the driving cylinder 206 turns the first and second hands 182 and 194 upside down to position the second hand 194 on the upper side and position the first hand 182 on the lower side, and moves the movable base 180 to the "third Z position". Accordingly, the tool gripped by the first hand 182 is attached at the attachment/detachment position PT. Subsequently, when the holding member 198 is moved to the "second X position", gripping of the tool by the first hand 182 is released. By the second change operation described above, the tool gripped by the second hand 182 and the tool at the attachment/detachment position PT are changed with each other. The tool gripped by the second hand 194 can be accommodated in the tool storage unit 106 by the accommodating operation described above.

Figure 5:
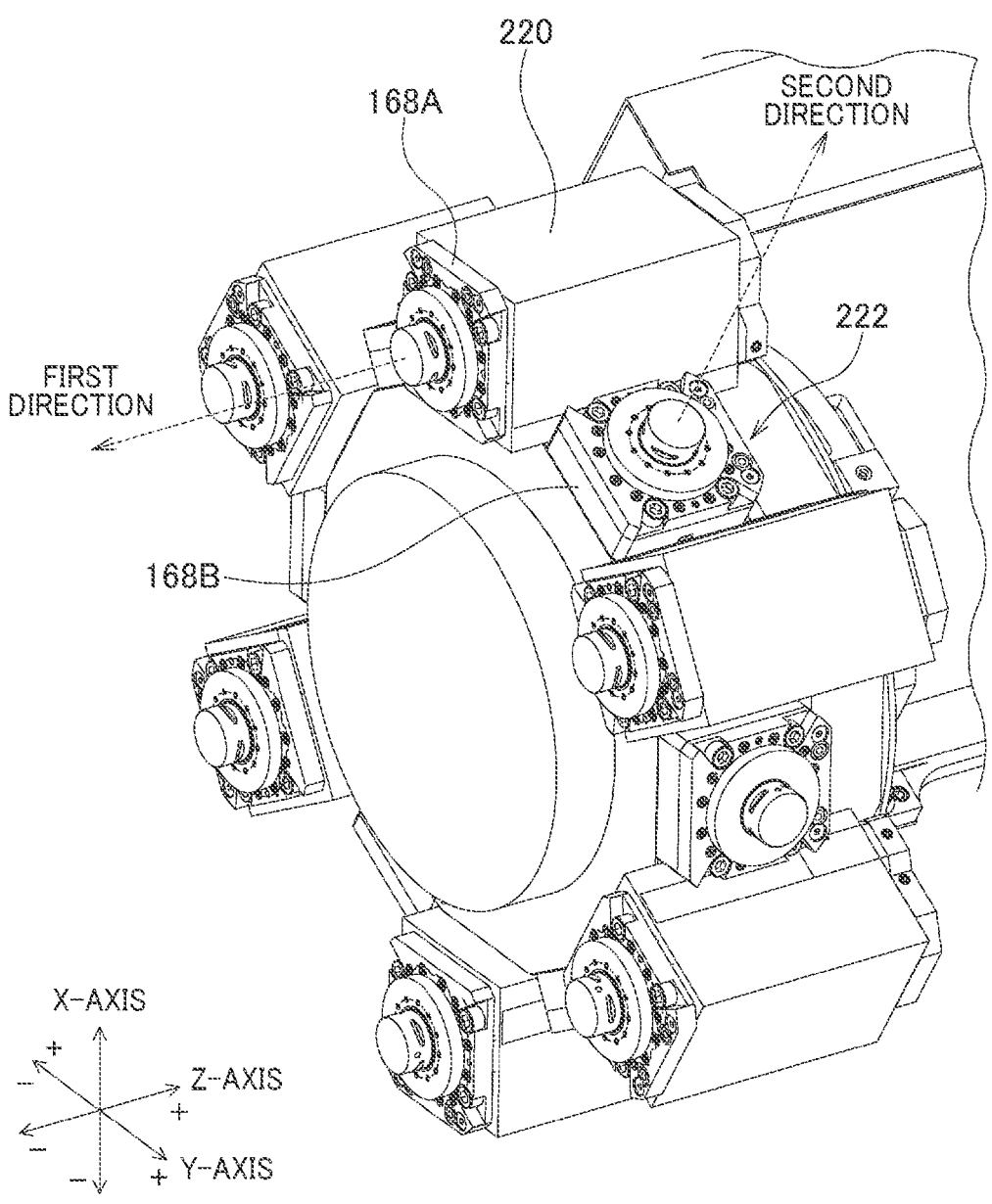
FIG. 5 is an external perspective view of a turret.

FIG. 5 is an external perspective view of the turret 164.

The turret 164 is connected to the turret base 102 to be rotatable about the Z-axis, as described above. The turret 164 has a shape of a dodecagonal prism and has 12 stations 222 (end faces) respectively formed on side surfaces. Each station 222 has an insertion hole. To the station 222, the holder 168 (a cylindrical perforated member illustrated in FIG. 5) may be inserted as it is, or a cartridge 220 (a box-shaped member illustrated in FIG. 5) may be inserted. The holder 168 may also be inserted into the cartridge 220. By inserting a shank portion of the tool T such as an endmill or a drill into the holder 168, 12 tools T are held by the turret 164. FIG. 5 illustrates a state where a tool with no cutting tool (hereinafter, a "dummy tool") is joined to each holder 168.

When the tool is directly fixed to the station 222, the longitudinal direction of the tool is coincident with the "second direction" that is the radial direction of the turret 164. In the following description, the holder 168 directly inserted into the station 222 is referred to as a "second holder 168B". Meanwhile, when the tool is fixed to the cartridge 220, the longitudinal direction of the tool is coincident with the "first direction" that is the axial direction of the turret 164. The first direction is also coincident with the negative side in the Z-axis direction in FIG. 5. In the following description, the holder 168 inserted into the cartridge 220 is referred to as a "first holder 168A". The first holder 168A and the second holder 168B are the same parts as each other, but the direction of holding a tool of each holder is changed depending on whether that holder is fixed to the station 222 via the cartridge 220.

The tool held by the first holder 168A cuts an inner-diameter side portion of a solid workpiece. The tool extending in the second direction and held by the second holder 168B cuts an outer-diameter side portion of a solid workpiece. In the present embodiment, six of the first holders 168A and six of the second holders 168B are disposed in the turret 164. Accordingly, six of the tools are used for inner diameter machining, and six of the tools are used for outer diameter machining.

Figure 6:
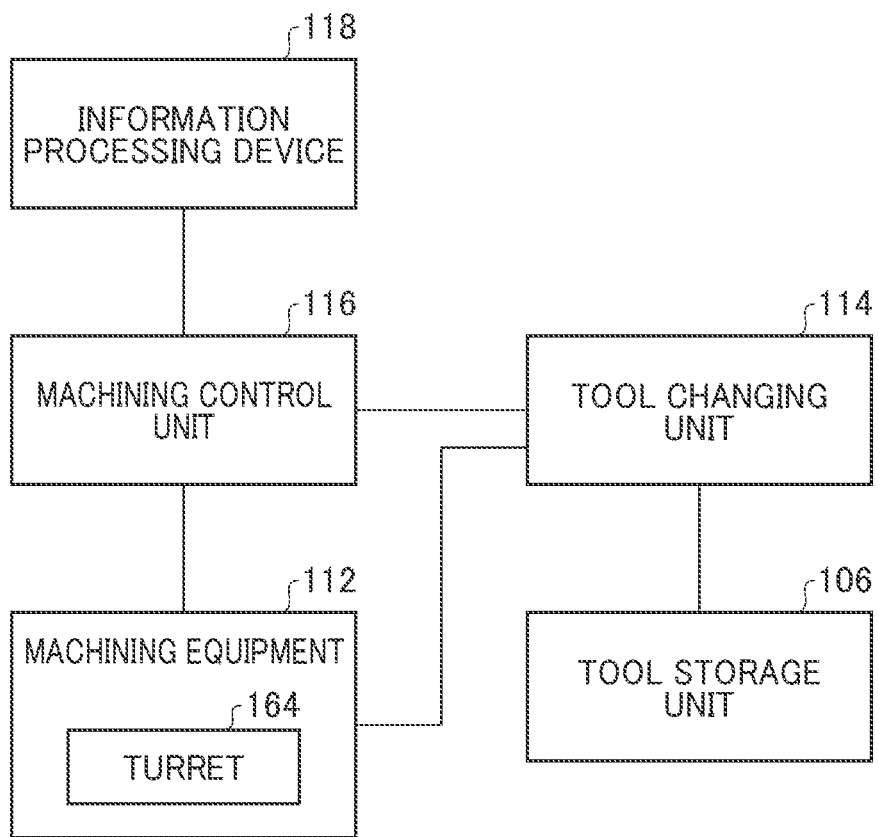
FIG. 6 is a hardware configuration diagram of the machine tool.

FIG. 6 is a hardware configuration diagram of the machine tool 100.

The machine tool 100 includes the information processing device 118, the machining control unit 116, the machining equipment 112, the tool changing unit 114, and the tool storage unit 106. The machining control unit 116 functioning as a numerical controller transmits a control signal to the machining equipment 112 in accordance with a machining program. The machining equipment 112 moves the turret base 102 to machine a workpiece in accordance with an instruction from the machining control unit 116. Further, the machining control unit 116 acquires a "tool pattern" indicating a combination of the tools T to be held by the turret 164 from a tool management unit 130 (described later). The machining control unit 116 causes the tool changing unit 114 to perform tool change in accordance with the tool pattern instructed from the tool management unit 130.

The information processing device 118 controls the machining control unit 116. In the present embodiment, the information processing device 118 provides a user interface function to an operator and manages tool patterns. The tool storage unit 106 stores spare tools therein. The tool changing unit 114 corresponds to a so-called ATC (Automatic Tool Changer). The tool changing unit 114 takes out a spare tool from the tool storage unit 106 and changes a work tool located at the change position of the turret 164 with the spare tool in accordance with a change instruction from the machining control unit 116.

Figure 7:
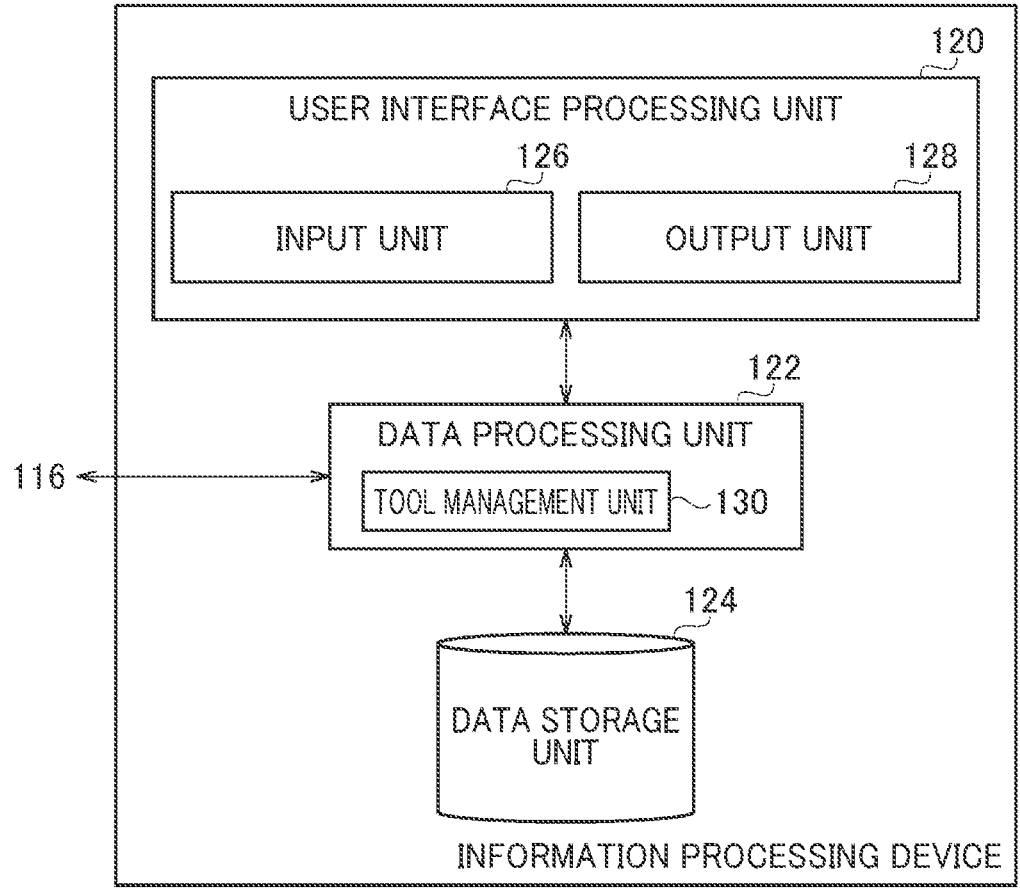
FIG. 7 is a functional block diagram of an information processing device.

FIG. 7 is a functional block diagram of the information processing device 118.

The components of the information processing device 118 are implemented by hardware including computing units such as central processing units (CPUs) and various co-processors, storage devices such as memories and storages, and wired or wireless communication lines that connect these units and devices, and software that is stored in the storage devices and supplies processing instructions to the computing units. Computer programs may be constituted by device drivers, operating systems, various application programs on upper layers thereof, and a library that provides common functions to these programs. Blocks that are described below do not refer to configurations in units of hardware but to blocks in units of functions.

Note that the machining control unit 116 may also be implemented by hardware including computing units such as processors, storage devices such as memories and storages, and wired or wireless communication lines that connect these units and devices, and software and programs that are stored in the storage devices.

The information processing device 118 includes a user interface processing unit 120, a data processing unit 122, and a data storage unit 124.

The user interface processing unit 120 receives an operation made by a user and performs user-interface-related processing such as displaying an image and outputting audio. The data processing unit 122 performs various type of processing on the basis of data acquired by the user interface processing unit 120 and data stored in the data storage unit 124. The data processing unit 122 also functions as an interface of the user interface processing unit 120 and the data storage unit 124. The data storage unit 124 stores various types of programs and setting data therein.

The user interface processing unit 120 includes an input unit 126 and an output unit 128.

The input unit 126 receives input made by the user via a touch panel or a hardware device such as a handle. The output unit 128 provides various types of information to the user by displaying an image or outputting audio.

The data processing unit 122 includes the tool management unit 130. The tool management unit 130 manages tool patterns each indicating a combination of work tools to be held by the turret 164.

The data storage unit 124 retains a tool pattern for each machining program. The machining control unit 116 performs tool change in accordance with the specified tool pattern as appropriate during execution of the machining program. The data storage unit 124 also retains spare tool information related to a tool ID, a model number (the type), and a state (usable or unusable) of a spare tool stored in the tool storage unit 106 as well as station setting information 230 and current pattern information 232 that will be described later. In addition, the tool management unit 130 also manages the number of uses (described later) for each tool.

FIG. 8 is a schematic diagram illustrating a relation between the station setting information 230 and the current pattern information 232.

The turret 164 has 12 types of stations 222 as described above. The stations 222 are identified by station numbers S1 to S12, respectively. The station 222 corresponding to the station number S1 is written as the "station 222 (S1)" in the following descriptions. The station setting information 230 in FIG. 8 indicates that a station 222 (S2) is for inner diameter machining. That is, the cartridge 220 and the first holder 168A are set to the station 222 (S2), and a tool for inner diameter machining is attached to the first holder 168A.

The station setting information 230 indicates whether there is a cartridge 220 in each station 222, in other words, whether each station 222 is for inner diameter machining or outer diameter machining. An operator sets the cartridge 220 to the turret 164 before starting machining work, and then registers the setting contents in the station setting information 230 via the input unit 126. The tool management unit 130 retains the station setting information 230 in the data storage unit 124.

A plurality of tool patterns each being a combination of tools to be attached to the turret 164 are registered in the data storage unit 124. Each tool pattern is identified by a pattern ID. A machining program includes a tool change instruction that specifies a pattern ID. Upon detecting the tool change instruction during execution of the machining program, the machining control unit 116 causes the tool changing unit 114 to perform tool change so as to reproduce the tool pattern specified by the tool change instruction on the turret 164.

The current pattern information 232 indicates a tool pattern indicating a combination of tools currently held by the turret 164 (hereinafter, also a "current pattern"). The tool management unit 130 updates the current pattern information 232 every time tool change is performed. A tool ID for uniquely identifying a tool and a model number indicating the type of the tool are set for the tool. For example, a tool to which the tool ID T4 and the model number P6 are assigned (hereinafter, written as a "tool (T4: P6)") is attached to a station 222 (S7: outer diameter machining). Since the tool (T4: P6) is for outer diameter machining, a shank portion of the tool (T4: P6) is inserted into the second holder 168B at the station 222 (S7).

A tool (T10: P6) is attached to a station 222 (S10: inner diameter machining). Since the tool (T10: P6) is for inner diameter machining, a shank portion of the tool (T10: P6) is inserted into the first holder 168A, the first holder 168A is inserted into the cartridge 220, and the cartridge 220 is set to the station 222 (S10). That is, it is found from the current pattern information 232 that two tools of the same type (P6) are held at the station 222 (S7: outer diameter machining) and the station 222 (S10: inner diameter machining).

The tool management unit 130 counts the number of uses for each tool (the details will be described later). When the number of uses reaches a threshold, the tool management unit 130 determines this tool as an unused tool that is not to be used any longer. The tool management unit 130 manages the number of uses for each tool. In addition, the tool management unit 130 registers, in spare tool information, a tool ID and a model number for each spare tool and information indicating whether that spare tool is a normal tool or an unused tool.

Here, a case is assumed in which three tools including a tool (T2: P8) at a station 222 (S4: inner diameter machining), the tool (T4: P6) at the station 222 (S7: outer diameter machining), and a tool (T26: P12) at a station 222 (S9: outer diameter machining) are changed with spare tools (P1). The machining control unit 116 instructs the tool changing unit 114 to perform tool change, and the tool changing unit 114 picks up the tools (P1) from the tool storage unit 106 in turn. The tool changing unit 114 detaches work tools from the station 222 (S4) and the like and changes the work tools with the spare tools (P1) in turn.

Figure 9:
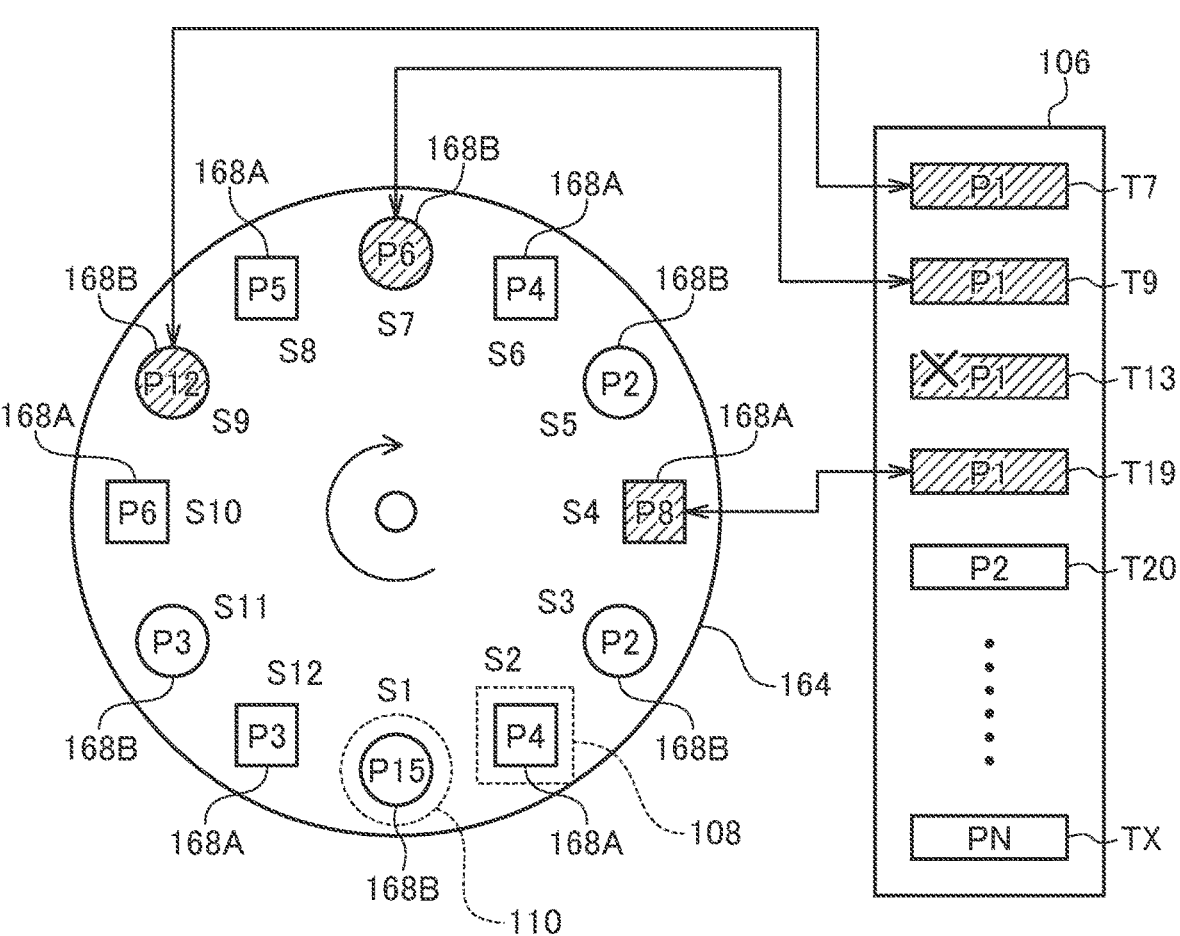
FIG. 9 is a first schematic diagram for explaining unevenly-distributed tool change.

FIG. 9 is a first schematic diagram for explaining unevenly-distributed tool change.

As described above, the turret 164 is connected to the turret base 102 of the machine tool 100. The turret 164 is configured to be rotatable about its center axis. The turret 164 includes the 12 stations 222 each capable of holding the holder 168 or the cartridge 220. The work tool is attached to the holder 168.

In FIG. 9, the first holders 168A (for inner diameter machining) are represented by squares, and the second holders 168B (for outer diameter machining) are represented by circles. As illustrated in the station setting information 230 of FIG. 8, six first holders 168A and six second holders 168B are alternately attached to the turret 164 illustrated in FIG. 9.

A tool is attached to the first holder 168A for inner diameter machining or the second holder 168B for outer diameter machining. The first holder 168A is inserted into the cartridge 220, and the cartridge 220 is set to the station 222. The second holder 168B is directly set to the station 222. A work tool (P15) is attached to the station 222 (S1: outer diameter machining) in FIG. 9. The work tool (S1: P15) is used for outer diameter machining.

Similarly, a work tool (P4) is attached to the station 222 (S2: inner diameter machining), and a work tool (P2) is attached to a station 222 (S3: outer diameter machining).

The turret base 102 machines a workpiece with a work tool corresponding to a predetermined machining position 110. In FIG. 9, the workpiece is machined with the work tool (P15) located at the station 222 (S1: outer diameter machining). The machine tool 100 moves the turret base 102 and applies the work tool (P15) to a predetermined position of the workpiece at a predetermined angle, thereby machining an outer-diameter side portion of the workpiece. In order to perform inner diameter machining of the workpiece with the other work tool (S2: P4), it suffices that the machining control unit 116 rotates the turret 164 to index the work tool (S2: P4) to the machining position 110. At this time, the tool management unit 130 counts up the number of uses of the tool (S2: P4).

A work tool corresponding to a change position 108 is a target of tool change. The tool storage unit 106 that is also called a tool magazine, in general, has a number of spare tools stored therein. For example, when a spare tool (T20: P2) is to be attached to the turret base 102, the machine tool 100 stores the work tool (P4) at the change position 108 (the station 222 (S2)) (corresponding to the "attachment/detachment position PT") in the tool storage unit 106 and attaches the spare tool (T20: P2) to the station 222 (S2) corresponding to the change position 108.

As described above, the machine tool 100 machines a workpiece, while changing a relative distance and a relative angle between a workpiece and a work tool by moving the turret base 102. Further, the machine tool 100 selects one of 12 work tools which is to be used by rotating the turret 164. In inner diameter machining of a workpiece, a work tool held by the first holder 168A is selected. In outer diameter machining, a work tool held by the second holder 168B is selected.

Work tools and spare tools can be changed with each other at any time. By storing a large number of spare tools in the tool storage unit 106 having a large capacity, various types of machining can be realized with one machine tool 100. Meanwhile, by attaching 12 types of work tools that are relatively frequently used to the turret 164, it is possible to reduce loss of time associated with tool change.

In particular, as for a frequently used tool, a plurality of the tools may be attached to the turret 164 at the same time. In FIG. 9, a case is assumed in which three work tools including a work tool (P8) at the station 222 (S4: inner diameter machining), a work tool (P6) at the station 222 (S7: outer diameter machining), and a work tool (P12) at the station 222 (S9: outer diameter machining) are changed with the spare tools (P1) in the tool storage unit 106.

The second holder 168B (for outer diameter machining) is attached to each of the station 222 (S9) and the station 222 (S7), and the first holder 168A (for inner diameter machining) is attached to the station 222 (S4). Therefore, after tool change, one of the three tools (P1) is attached to the first holder 168A as a tool for inner diameter machining, and the other two are attached to the second holders 168B as tools for outer diameter machining. The above-described tool change that realizes a state where a plurality of the tools (P1) of the same type are attached to both the first holder(s) 168A and the second holder(s) 168B in such a manner that the number of tools attached to one of the first and second holders is larger than the number of tools attached to the other holders is referred to as an "unevenly-distributed tool change".

In the case of FIG. 9, the number of the spare tools (P1) stored in the tool storage unit 106 is four. In the four tools (P1), a tool (T7: P1), a tool (T9: P1), and a tool (T19: P1) are normal tools, and a tool (T13: P1) is an unused tool. Even when the unused tool (T13: P1) is attached to the station 222 (S4: inner diameter machining), outer diameter machining is possible because the normal tools (P1) are attached to the station 222 (S7: outer diameter machining) and the station 222 (S9: outer diameter machining). However, since the unused tool (P1) attached to the station 222 (S4: inner diameter machining) on the minority side cannot be used, the machine tool 100 can no longer perform inner diameter machining.

To avoid such a situation, when instructing the tool changing unit 114 to perform tool change, the machining control unit 116 causes the tool changing unit 114 to select a target of tool change only from the normal tools. Specifically, in tool change, the tool management unit 130 checks spare tool information and indicates tool IDs of the three normal tools (P1) to the machining control unit 116. In the example illustrated in FIG. 9, the machining control unit 116 causes tool change to be performed using the three normal tools T7, T9, and T19 in accordance with the instruction from the tool management unit 130. The tool changing unit 114 attaches these three normal tools (P1) to the station 222 (S4: inner diameter machining), the station 222 (S7: outer diameter machining), and the station 222 (S9: outer diameter machining). According to this control method, the normal tools (P1) are attached to all of the station 222 (S7: outer diameter machining), the station 222 (S9: outer diameter machining), the station 222 (S4: inner diameter machining), so that the machine tool 100 can perform both inner diameter machining and outer diameter machining.

A creator of a machining program does not need to describe an algorithm for excluding the unused tool (T13: P1) from targets of selection in the machining program. The machining control unit 116 performs machining work in accordance with the machining program and, when tool change occurs, checks changeable tools in the tool management unit 130. The tool management unit 130 refers to spare tool information and notifies the machining control unit 116 of a usable normal tool. The machining control unit 116 instructs the tool changing unit 114 to perform tool change in accordance with the notification from the tool management unit 130. According to this control method, the machine tool 100 can select and attach a normal tool to the turret 164 without causing the creator of the machining program to consider handling of an unused tool.

The tool management unit 130 counts for each tool the number of times that the tool is indexed to the machining position 110 and becomes a tool to be used. When the number of uses for a tool reaches a threshold, the tool management unit 130 determines this tool as an unused tool that is not to be used any longer. Since a tool is also worn in association with machining of a workpiece, the threshold (limit value) of the number of uses is set for each tool in advance.

After tool change for the three tools (P1), when the work tool (S7: P1) for outer diameter machining, for example, becomes an unused tool during machining, the tool management unit 130 causes the other work tool (S9: P1) for outer diameter machining to be set at the machining position 110, whereby the machining control unit 116 continues outer diameter machining of a workpiece with the work tool (S9: P1). As described above, by attaching two of the work tools (P1) to the turret 164 as tools for outer diameter machining, the work efficiency can easily be maintained because, even when one of the work tools (P1) becomes an unused tool, the other work tool (P1) of the same type can be used immediately. The tool management unit 130 also registers the number of uses for each tool in the data storage unit 124 every time the tool management unit 130 updates the number of uses for each tool.

Figure 10:
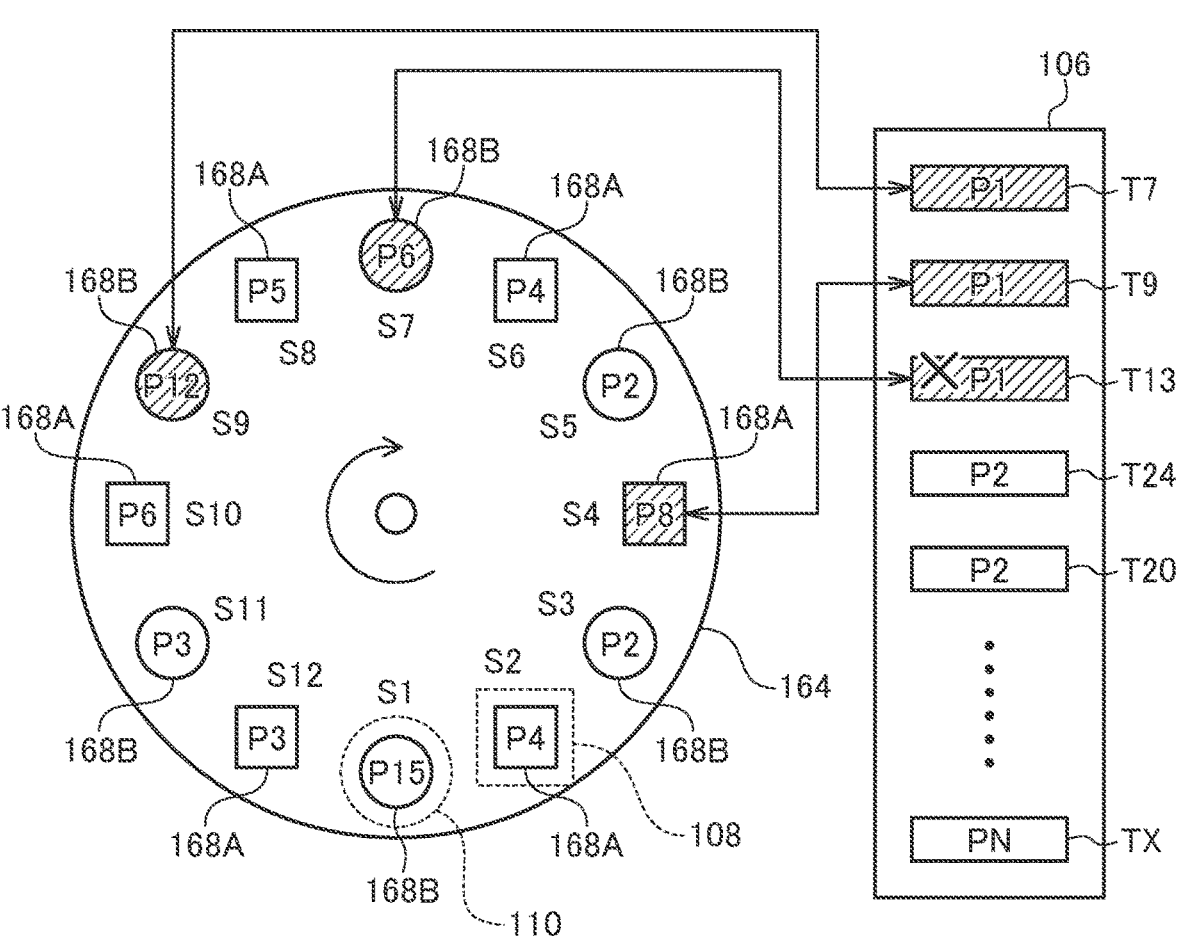
FIG. 10 is a second schematic diagram for explaining the unevenly-distributed tool change.

FIG. 10 is a second schematic diagram for explaining unevenly-distributed tool change.

In the example illustrated in FIG. 10, the number of the spare tools (P1) stored in the tool storage unit 106 is three. In the three spare tools (P1), the tool (T7: P1), the tool (T9: P1) are normal tools, and the tool (T13: P1) is an unused tool.

In a case of performing unevenly-distributed tool change for the three spare tools (P1), when only two of the normal tools (P1) are stored in the tool storage unit 106, the tool management unit 130 instructs the machining control unit 116 to attach the unused tool (T13: P1) to the station 222 (S9: outer diameter machining) or the station 222 (S7: outer diameter machining). Both the station 222 (S9) and the station 222 (S7) are for outer diameter machining on the majority side. A description related to FIG. 10 is provided assuming that the unused tool (T13: P1) is attached to the station 222 (S7).

As a result of tool change, the normal tool (T7: P1) is attached to the station 222 (S9: outer diameter machining), the unused tool (T13: P1) is attached to the station 222 (S7: outer diameter machining), and the normal tool (T9: P1) is attached to the station 222 (S4: inner diameter machining). Since the normal tools (P1) are attached to both the first holder 168A (inner diameter machining) and the second holder 168B (outer diameter machining), the machine tool 100 can perform both inner diameter machining and outer diameter machining for a workpiece also after tool change.

Unevenly-distributed tool change illustrated in FIGS. 9 and 10 is performed in a situation where both inner diameter machining and outer diameter machining use the tools (P1) of the same type. By attaching the tools (P1) of the same type to both the first holder 168A (inner diameter machining) and the second holder 168B (outer diameter machining), it is possible to perform inner diameter machining and outer diameter machining while using the tools (P1) properly, only by rotating the turret 164 as described above.

Further, in a case where outer diameter machining is more frequently performed than inner diameter machining, one of the tools (P1) is arranged in the first holder 168A (for inner diameter machining), and two of the tools (P1) are arranged in the second holders 168B (for outer diameter machining). This arrangement allows machining of a workpiece to be continued without performing tool change because, even if one of the tools (P1) for outer diameter machining becomes an unused tool, it suffices to use the other tool (P1) for outer diameter machining. In other words, by attaching the two tools (P1) for outer diameter machining to the turret 164 by unevenly-distributed tool change to give a margin in the number to the tools (P1) for outer diameter machining, it is possible to easily reduce loss of time associated with tool change even if one of the two tools becomes an unused tool during machining.

If two of the tools T (P1) are also attached to the first holders 168A (inner diameter machining), reliability is more improved. However, there are also cases where it is desired to hold as many types of tools as possible on the turret 164. For this reason, it is not necessarily reasonable to give a margin in the number to tools not only for outer diameter machining but also for inner diameter machining. In the present embodiment, continuity of outer diameter machining with the tool (P1) is increased by attaching two tools (P1) for outer diameter machining, in other words, by an unevenly-distributed tool change method that sets tools for outer diameter machining more frequently used as the majority-side tools.

Assuming that the above configuration is employed, when there are only two normal tools (P1) in the tool storage unit 106 in performing unevenly-distributed tool change, in other words, when the normal tools (P1) for the planned number of tool change are not stored in the tool storage unit 106, the two normal tools (P1) are distributed to the first holder 168A for inner diameter machining and the second holder 168B for outer diameter machining, and the unused tool (P1) is attached to the second holder 168B on the majority side. By executing emergency control as described above, it is possible to perform both outer diameter machining and inner diameter machining also after tool change.

Figure 11:
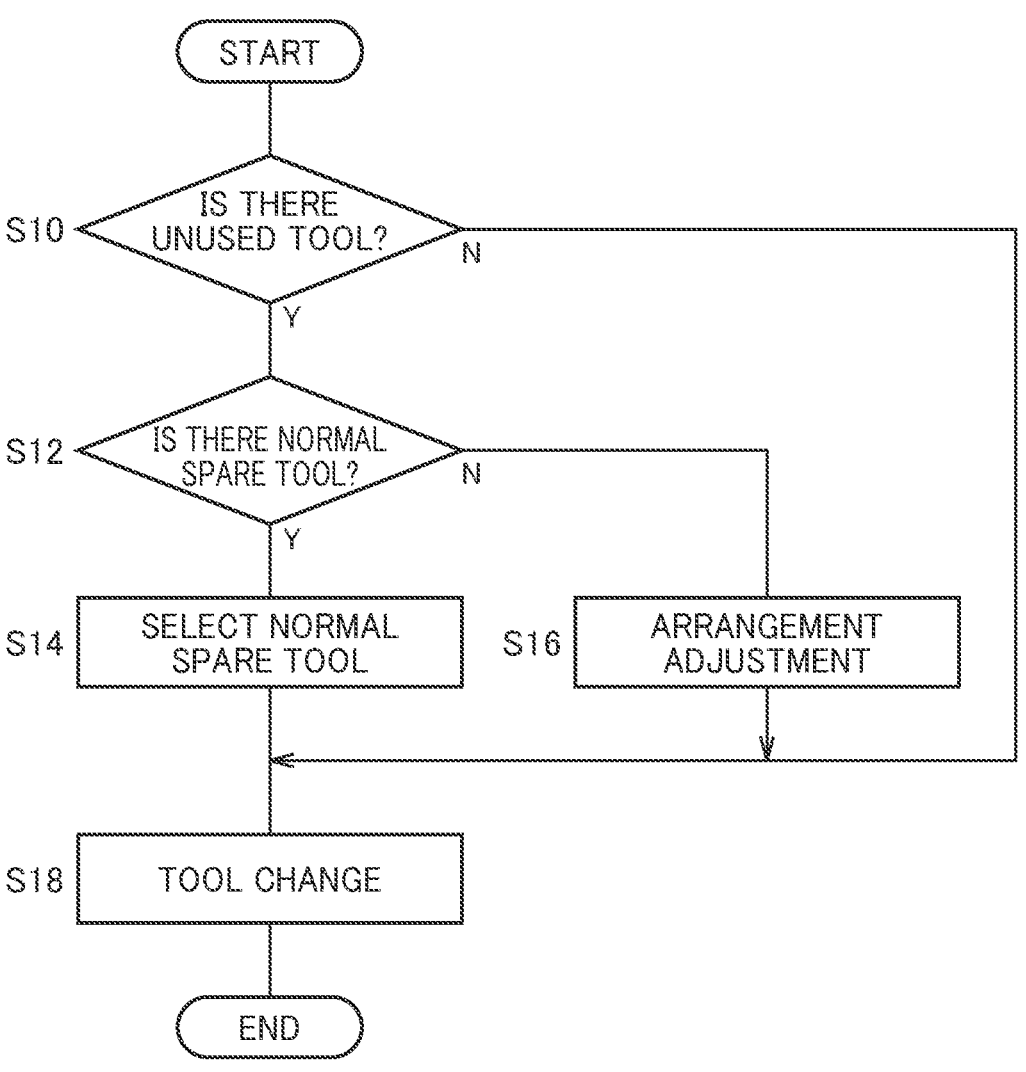
FIG. 11 is a flowchart illustrating processes of the unevenly-distributed tool change.

FIG. 11 is a flowchart illustrating processes of unevenly-distributed tool change.

This flowchart illustrates processes when a tool change instruction is detected in a machining program and three tools (P1) of the same type are subjected to unevenly-distributed tool change.

When the tools (P1) stored in the tool storage unit 106 do not include an unused tool (N at S10), in other words, when all the tools (P1) stored in the tool storage unit 106 are normal tools, the tool management unit 130 permits the machining control unit 116 to perform tool change, and the tool changing unit 114 performs tool change (S18). In this case, three usable tools (P1) are attached to the turret 164.

When the tools (P1) stored in the tool storage unit 106 include an unused tool (Y at S10), the tool management unit 130 determines whether only normal (usable) spare tools (P1) can be selected as targets of tool change (S12). As described in relation to FIG. 9, when the normal tools (P1) for the planned number of tool change are present although the unused tool (P1) is present, it suffices to set only the normal spare tools as the targets of tool change. When the normal tools (P1) for the planned number of tool change are stored (Y at S12), the tool management unit 130 notifies the machining control unit 116 of tool IDs of the normal tools (P1) (S14). In a case of the example illustrated in FIG. 9, the tool management unit 130 notifies the machining control unit 116 of T7, T13, and T19 as the tool IDs, and the machining control unit 116 indicates these spare tools to the tool changing unit 114 as the targets of tool change. The tool changing unit 114 performs tool change in accordance with the indication from the tool management unit 116 (S18).

When the normal spare tools (P1) for the planned number of tool change are not present (N at S12), the tool management unit 130 instructs the machining control unit 116 to attach the unused tool (P1) to the majority-side station 222 (S16). As described in relation to FIG. 10, when the unused tool (T13: P1) is attached to the second holder 168B on the majority side, the machine tool 100 can perform both inner diameter machining and outer diameter machining with the tool (P1). The tool changing unit 114 performs tool change in accordance with the instruction from the tool management unit 116 (S18).

SUMMARIZATION

The machine tool 100 has been described above on the basis of the embodiment.

In a case of performing unevenly-distributed tool change for tools of the same type, machining of a workpiece may not be able to be continued when an unused tool is attached to the minority-side holder 168. When the number of normal tools is equal to the planned number of tool change, the tool management unit 130 selects only the normal spare tools as targets of tool change.

In this case, since all tools on the turret 164 become usable, machining of a workpiece can be continued.

Meanwhile, when the normal spare tools are not enough for the planned number of tool change, the tool management unit 130 attaches an unused tool to the majority side, thereby allowing machining of a workpiece to be continued.

In a case of attaching the tools (P1) of the same type to two of the second holders 168B and one of the first holders 168A, when there are only two normal tools (P1) in the tool storage unit 106, a method can also be considered in which these two normal tools (P1) are attached to the first holder 168A and the second holder 168B, respectively, and the remaining second holder 168B is left empty. However, during machining of a workpiece, a coolant is sprayed in a machining chamber, and chips of the workpiece are also scattered. Therefore, it is not preferable to leave the second holder 168B empty because the chips or the like may enter that second holder 168B.

A method of attaching another tool (P2) to the remaining second holder 168B in place of the unused tool (P1) can also be considered. However, if the other tool (P2) having a different shape from that of the tool (P1) originally intended is attached to the second holder 168B, the tool (P2) may interfere with a tailstock or the like because a machining program controls a moving path of the turret 164 assuming that the tool (P1) is attached to the second holder 168B. For this reason, it is also not preferable to attach a tool not intended by the machining program to the second holder 168B in place of the unused tool (P1). Furthermore, a method of preventing entrance of chips or the like by fitting a dedicated lid member to the second holder 168B can also be considered. However, when the lid member is accommodated in the tool storage unit 106, the accommodating space in the tool storage unit 106 is narrowed.

In the present embodiment, continuity of machining is increased by performing unevenly-distributed tool change as for the tools (P1) that are frequently used. When tools as targets of unevenly-distributed tool change include an unused tool, usable normal tools are attached to both the first holder 168A and the second holder 168B, and the unused tool is disposed on the second holder 168B on the majority side, whereby continuation of inner diameter machining and outer diameter machining for the time being is prioritized. Further, by attaching the unused tool to the second holder 168B on the majority side, the second holder 168B can be closed with the unused tool. Accordingly, entrance of chips or the like into the second holder 168B can be prevented.

In addition, since normal tools can be efficiently used, the number of tool change operations in the middle of machining is reduced, so that the total time involved in machining can be shortened. Consequently, the operating time of a machine tool can be shortened, which leads to energy saving.

In unevenly-distributed tool change, when there is only one normal tool in the tool storage unit 106, in other words, when the number of the normal tools is smaller than the planned number of tool change by two or more, the output unit 128 may notify an operator of the shortage by issuing a warning. In this case, the operator needs to take out the unused tool from the tool storage unit 106 and store a normal tool therein.

The present invention is not limited to the embodiment described above and modifications thereof, and any component thereof can be modified and embodied without departing from the scope of the invention. Components described in the embodiments and modifications can be combined as appropriate to form various embodiments. Some components may be omitted from the components presented in the embodiments and modifications.

[Modification]

In the present embodiment, a case has been described in which the second holders 168B for outer diameter machining form the majority side, the first holder(s) 168A for inner diameter machining form(s) the minority side, and an unused tool is attached to the second holder 168B on the majority side. The present invention is not limited thereto. The same applies to a case where the first holders 168A for inner diameter machining form the majority side, the second holder(s) 168B for outer diameter machining form(s) the minority side, and an unused tool is attached to the turret 164. In this case, the tool changing unit 114 attaches the unused tool to the first holder 168A on the majority side. When normal spare tools for the planned number of tool change are present, it suffices to attach only the normal spare tools to the first and second holders 168A and 168B.

In the present embodiment, the first holder 168A and the second holder 168B have been described as the "holder 168 that holds a tool for cutting an inner-diameter side portion of a workpiece" and the "holder 168 that holds a tool for cutting an outer-diameter side portion of a workpiece", respectively. The present invention is applicable not only to the inner-diameter side portion/outer-diameter side portion but also to a case where a plurality of tool holding methods are possible on the turret 164.

For example, unevenly-distributed tool change may be performed also when the long axis direction (first direction) of the first holder 168A and the long axis direction (second direction) of the second holder 168B are different from each other. The first direction and the second direction described here are any directions and may not be orthogonal to each other.

In addition, unevenly-distributed tool change may occur due to a difference in use, for example, a difference between turning and rotation. Some tools can be used for both turning and rotary machining. When a turning holder 168M is attached to the station 222, and a tool is attached to the turning holder 168M, this tool is used for turning. Meanwhile, when a rotary holder 168N is attached to the station 222, and a tool of the same type is attached to the rotary holder 168N, this tool is used for rotary machining.

For example, it is assumed that two of three spare tools (P1) are attached to the turning holders 168M and one is attached to the rotary holder 168N. In such unevenly-distributed tool change, when the spare tools (P1) as targets of tool change include an unused tool, the unused tool is attached to the turning holder 168M on the majority side by processes identical to those of the flowchart illustrated in FIG. 11.

The same applies to a case of attaching two of the three spare tools (P1) to the rotary holders 168N and one to the turning holder 168M. When the targets of tool change include an unused tool, the machining control unit 116 sets the unused tool (P1) on the rotary holder 168N on the majority side. This setting enables both turning and rotary machining for a workpiece to be continued for the time being.

The above description has been provided assuming the unevenly-distributed tool change in which the three tools (P1) are separated into two and one and are attached to the first and second holders 168A and 168B or to the turning holder(s) 168M and the rotary holder(s) 168N. Unevenly-distributed tool change is not limited to the case where the three tools are separated into two and one, and also includes a case where the plural tools (P1) of the same type are attached to the majority side and the minority side to be separated into, for example, three and one or three and two. When targets of tool change include an unused tool, the tool management unit 130 attaches the unused tool to the holder 168 on the majority side.

In the descriptions of the present embodiment, when the number of uses of a tool reaches a threshold, the tool management unit 130 determines this tool as an "unused tool". The present invention is not limited thereto. The tool management unit 130 may measure the usage time of a tool, for example, the time during which the tool is set at the machining position 110 as the usage time and determine this tool as an unused tool when this usage time reaches a threshold. The machine tool 100 may inspect the tool length at any timing during machining as appropriate. When the tool length is shortened by wear to a predetermined length or less, the tool management unit 130 may regard this tool as an unused tool.

Further another example of unevenly-distributed tool change is described.

First, it is assumed that tools are joined to the stations 222 (S1) to 222 (S3) of the turret 164 in the following manner.

Station 222 (S1: outer-diameter side): unused tool (T1: P1)

Station 222 (S2: inner-diameter side): unused tool (T2: P1)

Station 222 (S3: outer-diameter side): normal tool (T3: P1)

It is also assumed that an unused tool (T4: P1) and a normal tool (T5: P1) are respectively stored in a first pod and a second pod in the tool storage unit 106. A pod described here is information indicating a storing position of a tool in the tool storage unit 106.

A case is assumed in which the two unused tools (T1: P1) and (T2: P1) held by the turret 164 are to be changed with the normal tools (P1). Since there is only one normal tool (P1) in the tool storage unit 106, only either one of the unused tool (T1: P1) at the station 222 (S1: outer-diameter side) and the unused tool (T2: P1) at the station 222 (S2: inner-diameter side) can be changed.

In this situation, the machining control unit 116 instructs the tool changing unit 114 to perform tool change that changes the unused tool (T2: P1) held at the station 222 (S2: inner-diameter side) on the minority side with the normal tool (T5: P1) in the second pod. As a result of tool change, the tool arrangement at the stations 222 (S1) to 222 (S3) of the turret 164 is as described below.

Station 222 (S1: outer-diameter side): unused tool (T1: P1)

Station 222 (S2: inner-diameter side): normal tool (T5: P1)

Station 222 (S3: outer-diameter side): normal tool (T3: P1)

In the tool storage unit 106, the unused tool (T4: P1) is stored in the first pod, and the unused tool (T2: P1) that has been changed is stored in the second pod.

After the above-described tool change, one of the three tools (P1) mounted on the turret 164 is the unused tool (T1: P1). However, the normal tool (T5: P1) and the normal tool (T3: P1) can be arranged on both the inner-diameter side and the outer-diameter side, and therefore both inner diameter machining and outer diameter machining can be performed after tool change.

Since the tool (T1: P1) held at the station 222 (S1: outer-diameter side) after tool change is unusable, the machining control unit 116 executes control so as to prevent the station 222 (S1: outer-diameter side) from being indexed to the machining position 110.

In the present embodiment, unevenly-distributed tool change has been described as an example, in which the plural tools (P1) of the same type are attached on both the inner-diameter side and the outer-diameter side, and the attached tools on one of the inner-diameter side and the outer-diameter side is more than the attached tools on the other side. Attaching of tools is not limited to the inner-diameter side and the outer-diameter side. The tool change method described in relation to FIG. 9 can be applied as long as a plurality of tools of the same type are attached in a distributed manner with a plurality of methods such as turning and rotary machining, inner diameter machining and turning, inner diameter machining and rotary machining, outer diameter machining and turning, and outer diameter machining and rotary machining.

Further, not only in the unevenly-distributed tool change but also in a situation in which the same number of unused tools are arranged on the inner-diameter side and the outer-diameter side as described below, it is desirable to perform tool change so as to prevent the unused tools from being unevenly arranged for two types of attaching methods such as methods for the inner-diameter side and the outer-diameter side.

It is assumed that tools are attached to the stations 222 (S1) to 222 (S4) of the turret 164 in the following manner.

Station 222 (S1: outer-diameter side): unused tool (T1: P1)

Station 222 (S2: outer-diameter side): unused tool (T2: P1)

Station 222 (S3: inner-diameter side): unused tool (T3: P1) Station 222 (S4: inner-diameter side): unused tool (T4: P1)

It is also assumed that the normal tool (T5: P1) and a normal tool (T6: P1) are respectively stored in the first pod and the second pod in the tool storage unit 106.

Since the four tools (P1) attached to the turret 164 are all unused tools, machining cannot be continued. Since there are only two normal tools (P1) in the tool storage unit 106, only two of the four unused tools (P1) can be changed with the normal tools (P1).

In this situation, the machining control unit 116 selects the unused tool (P1) held at the station 222 for inner-diameter side and the unused tool (P1) held at the station 222 for outer-diameter side as target of tool change. As a result of tool change, the tool arrangement at the stations 222 (S1) to 222 (S4) of the turret 164 is as described below.

Station 222 (S1: outer-diameter side): unused tool (T1: P1)

Station 222 (S2: outer-diameter side): normal tool (T5: P1)

Station 222 (S3: inner-diameter side): unused tool (T3: P1)

Station 222 (S4: inner-diameter side): normal tool (T6: P1)

In the tool storage unit 106, the unused tool (T2: P1) that has been changed is stored in the first pod, and the unused tool (T4: P1) that has been changed is stored in the second pod.

After the above-described tool change, two of the four tools (P1) mounted on the turret 164 are the unused tools (T1: P1) and (T3: P1). However, since the normal tool (T5: P1) and the normal tool (T6: P1) can be arranged on both the inner-diameter side and the outer-diameter side, both inner diameter machining and outer diameter machining can be performed.

Also in this case, since the tool (T1: P1) and the tool (T3: P1) held at the station 222 (S1: outer-diameter side) and the station 222 (S3: inner-diameter side) are unusable, the machining control unit 116 executes control so as to prevent the station 222 (S1: outer-diameter side) and the station 222 (S3: inner-diameter side) from being indexed to the machining position 110.

The turret 164 illustrated in FIG. 5 assumes that a machining spindle is a left spindle. In FIG. 5, a tool for inner diameter machining is inserted into the first holder 168A rightward (to the positive side in the Z-axis direction), and therefore that tool faces left (the negative side in the Z-axis direction). The present invention is not limited to the left spindle, but can also be applied to a right spindle.

The present invention can also be applied to the turret 164 having three types of holders 168, i.e., the first holder 168A facing right and the first and second holders 168A and 168B facing left, in other words, the turret 164 capable of being used for both a right spindle and a left spindle.

A cap member for closing a hole into which a shank of a tool is to be inserted may be joined to the holder 168. Although an ordinary tool with a blade may be joined to the holder 168 in place of a cap, it is preferable to use the cap member because the ordinary tool is more likely to cause interference than the cap member. Further, a dummy tool may be joined to the holder 168 in place of the cap member as described above. In a case of the dummy tool, it can be joined to the turret 164 by a tool change method by the tool changing unit 114 (ATC). By joining the cap member or the dummy tool, it is possible to prevent chips and oil from entering the hole of the holder 168 during machining.

This application claims priority to Japanese Patent Application No. 2022-013923 filed on Feb. 1, 2022, which is incorporated herein by reference in its entirety.

What is claimed is:

1. A machine tool comprising:
a tool rest including: (i) a plurality of first holders each configured to hold a respective tool for cutting an inner-diameter side portion of a workpiece, and (ii) a plurality of second holders each configured to hold a respective tool for cutting an outer-diameter side portion of a workpiece;
a machining control unit configured to control a tool held by the tool rest to machine a workpiece in accordance with a machining program;
a tool storage unit capable of storing a plurality of tools therein;
a tool changing unit configured to change one of the tools held by the tool rest with one of the tools stored in the tool storage unit; and
a tool management unit configured to identify an unusable tool in the tools stored in the tool storage unit, the unusable tool being a tool that cannot be used to perform machining, wherein
in a case where the machining program utilizes a plurality of tools of a same first type, which plurality of tools of the first type includes tools that are to be attached to ones of the first holders, and which plurality of tools of the first type also includes a tool that is to be attached to a respective one of the second holders, and when the tools of the first type include the unusable tool and, when the ones of the first holders and the one of the second holders to which the tools of the first type are to be attached have a quantity of the first holders that is larger than the quantity of the second holders, the machining control unit causes the tool changing unit to attach the unusable tool to one of the first holders.

2. The machine tool according to claim 1, wherein, when the plurality of tools stored in the tool storage unit includes a usable tool of the first type, the tool changing unit selects the usable tool in the tool storage unit as a target of tool change.

3. The machine tool according to claim 2, wherein the tool changing unit removes the unusable tool from the tool storage unit and attaches the unusable tool to the one of the first holders under a condition that enough usable tools of the first type for a planned number of tool changes between the tool storage unit and the tool rest are not stored in the tool storage unit.

4. A machine tool comprising:
a tool rest including: (i) a plurality of first holders each configured to allow a respective shank portion of a respective tool to be inserted thereinto in a first direction to hold the respective tool, and (ii) a plurality of second holders each configured to allow a respective shank portion of a respective tool to be inserted thereinto in a second direction different from the first direction to hold the respective tool;
a machining control unit configured to control a tool held by the tool rest to machine a workpiece in accordance with a machining program;
a tool storage unit capable of storing a plurality of tools therein;
a tool changing unit configured to change one of the tools held by the tool rest with one of the tools stored in the tool storage unit; and
a tool management unit configured to identify an unusable tool in the tools stored in the tool storage unit, the unusable tool being a tool that cannot be used to perform machining, wherein
in a case where the machining program utilizes a plurality of tools of a same first type, which plurality of tools of the first type includes tools that are to be attached to ones of the first holders, and which plurality of tools of the first type also includes a tool that is to be attached to a respective one of the second holders, and when the tools of the first type include the unusable tool and, when the ones of the first holders and the one of the second holders to which the tools of the first type are to be attached have a quantity of the first holders that is larger than a quantity of the second holders, machining control unit causes the tool changing unit to attach the unusable tool to one of the first holders.

5. The machine tool according to claim 4, wherein
the first direction is one of a radial direction and an axial direction of the tool rest, and
the second direction is the other of the radial direction and the axial direction of the tool rest.

* * * * *